United States Patent
Park

(10) Patent No.: US 11,795,849 B1
(45) Date of Patent: Oct. 24, 2023

(54) APPARATUS FOR PURIFYING EXHAUST GAS

(71) Applicants: HYUNDAI MOTOR COMPANY, Seoul (KR); KIA CORPORATION, Seoul (KR)

(72) Inventor: Jun Sung Park, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/107,361

(22) Filed: Feb. 8, 2023

(30) Foreign Application Priority Data

Jul. 13, 2022 (KR) .......................... 10-2022-0086289

(51) Int. Cl.
| | | |
|---|---|---|
| *F01N 3/00* | (2006.01) | |
| *F01N 3/10* | (2006.01) | |
| *F01N 13/00* | (2010.01) | |
| *F01N 3/20* | (2006.01) | |
| *B01D 53/94* | (2006.01) | |
| *F01N 3/28* | (2006.01) | |

(52) U.S. Cl.
CPC .......... *F01N 3/101* (2013.01); *B01D 53/945* (2013.01); *F01N 3/2026* (2013.01); *F01N 3/2803* (2013.01); *F01N 13/0093* (2014.06); *B01D 2255/9155* (2013.01); *F01N 2370/04* (2013.01)

(58) Field of Classification Search
CPC ...... F01N 3/101; F01N 3/2026; F01N 3/2803; F01N 13/0093; F01N 2370/04; B01D 53/945; B01D 2255/9155
See application file for complete search history.

(56) References Cited

U.S. PATENT DOCUMENTS

| | | | | |
|---|---|---|---|---|
| 5,743,086 A | * | 4/1998 | Nagai | ................. F02D 41/0235 60/276 |
| 10,995,645 B2 | * | 5/2021 | Paukner | ................. B01D 46/84 |
| 2008/0282673 A1 | * | 11/2008 | Gonze | ................. F01N 13/0097 60/284 |

(Continued)

FOREIGN PATENT DOCUMENTS

| | | | | |
|---|---|---|---|---|
| DE | 112019006601 T5 | * | 9/2021 | .......... F01N 13/008 |
| JP | H1182000 A | * | 3/1999 | |

*Primary Examiner* — Matthew T Largi
(74) *Attorney, Agent, or Firm* — MCDONNELL BOEHNEN HULBERT & BERGHOFF LLP

(57) ABSTRACT

An apparatus for purifying exhaust gas includes an engine for producing power by burning a mixture of air and fuel, and discharging exhaust gas generated in a combustion process to the outside through an exhaust pipe; a first three-way catalyst (TWC) and a second three-way catalyst which are sequentially mounted on the exhaust pipe at a rear end of the engine, and convert noxious gas including carbon monoxide (CO), hydrocarbons (HC), and nitrogen oxide ($NO_x$) contained in the exhaust gas into harmless components through an oxidation-reduction reaction; and an electrically heated catalyst (EHC) mounted between the first three-way catalyst and the second three-way catalyst and heated by application of electric power to transfer heat to the first three-way catalyst and the second three-way catalyst to cause the first three-way catalyst and the second three-way catalyst to reach a catalyst activation temperature.

11 Claims, 2 Drawing Sheets

(56) References Cited

U.S. PATENT DOCUMENTS

| | | | |
|---|---|---|---|
| 2009/0000276 A1* | 1/2009 | Hokuto | F02D 41/0045 60/299 |
| 2011/0030344 A1* | 2/2011 | Gonze | B60W 10/06 60/274 |
| 2011/0047980 A1* | 3/2011 | Santoso | B60W 10/08 60/285 |
| 2013/0239552 A1* | 9/2013 | Gonze | F01N 3/2013 60/276 |
| 2017/0138245 A1* | 5/2017 | Hagiwara | F01N 13/009 |
| 2020/0116061 A1* | 4/2020 | Hupfeld | B60N 2/002 |
| 2020/0232359 A1* | 7/2020 | Kaack | F01N 3/101 |

* cited by examiner

APPARATUS FOR PURIFYING EXHAUST GAS

CROSS REFERENCE TO RELATED APPLICATIONS

This application claims priority to and the benefit of Korean Patent Application No. 10-2022-0086289 filed in the Korean Intellectual Property Office on Jul. 13, 2022, the entire contents of which are incorporated herein by reference.

BACKGROUND

(a) Field

The present disclosure relates to an apparatus for purifying exhaust gas, and more particularly, to an apparatus for purifying exhaust gas that includes an electrically heated catalyst (EHC) and a three-way catalyst and has improved purification performance of harmful exhaust gas components.

(b) Description of the Related Art

Following the EU6 emission gas regulation implemented in 2014, the EU7 emission gas regulation will be implemented from years of 2025 to 2026. The EU7 regulation is expected to be implemented with a focus on heavy reducing the emission of low-temperature noxious gas compared to the various regulations that have been proposed and implemented so far. As a result, as most of the RDE driving restrictions disappear, how to effectively reduce noxious gas generated by engine driving before the reach to the catalyst activation temperature will be the key to respond to the EU7 regulations.

Most gasoline engines developed so far have used a method of shortening the catalyst activation time by increasing exhaust energy by lowering combustion efficiency immediately after starting. However, if a vehicle enters the driving condition immediately after starting and rapid acceleration driving is performed, exceeding the gaseous emission regulation is inevitable, and a different approach from the current one is needed to respond to the gaseous emission regulation in the foregoing extreme driving condition. In this process, as a method of rapidly activating the catalyst, applying an electrically heated catalyst (EHC) to the front end of the catalyst is being considered.

In an exhaust system to which an electrically heated catalyst is applied, an electrically heated catalyst is generally disposed at a rear end of an engine combustion chamber, and a three-way catalyst is disposed at a rear end of the electrically heated catalyst. However, in such an exhaust system, when no electric power is applied to the electrically heated catalyst, the electrically heated catalyst may hinder the supply of heat to the three-way catalyst. In addition, the exhaust gas purification function may be deteriorated in the three-way catalyst, which is disposed at the rear end of the electrically heated catalyst and exposed lower temperature. In addition, in the process of configuring the catalytic converter in the limited engine room space, the catalyst volume is reduced due to the addition of the electrically heated catalyst, which leads to a decrease in the exhaust gas purification function due to the reduction of the noxious gas reaction area.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus for purifying exhaust gas, in which an electrically heated catalyst is mounted between two three-way catalysts located at a rear end of an engine combustion chamber, so that the three-way catalyst quickly reaches an activation temperature through electrically heated catalyst heating and reduces heat loss to improve noxious exhaust gas component purification performance.

An exemplary embodiment of the present disclosure provides an apparatus for purifying exhaust gas, the apparatus including an engine for producing power by burning a mixture of air and fuel, and discharging exhaust gas generated in a combustion process to the outside through an exhaust pipe, a first three-way catalyst (TWC) and a second three-way catalyst which are sequentially mounted on the exhaust pipe at a rear end of the engine, and convert noxious gas including carbon monoxide (CO), hydrocarbons (HC), and nitrogen oxide ($NO_x$) contained in the exhaust gas into harmless components through an oxidation-reduction reaction, and an electrically heated catalyst (EHC) mounted between the first three-way catalyst and the second three-way catalyst and heated by application of electric power to transfer heat to the first three-way catalyst and the second three-way catalyst to cause the first three-way catalyst and the second three-way catalyst to reach a catalyst activation temperature.

The engine may be an engine of an electrified internal combustion engine that produces power by using an internal combustion engine and a motor.

The electrically heated catalyst may have a lower cell density than the first three-way catalyst and the second three-way catalyst.

The electrically heated catalyst may supply heat energy to the first three-way catalyst and the second three-way catalyst by using electric energy of a battery mounted in a mild hybrid electric vehicle (MHEV) or a (plugged-in) hybrid electric vehicle ((P)HEV).

Driving of the electrically heated catalyst may vary according to a state of charge (SOC) of the battery, a temperature of the engine, an operating mode of the engine, temperature and flow rate of the exhaust gas, temperatures of the first three-way catalyst and the second three-way catalyst, outdoor conditions, operating time and non-operating time of the electrically heated catalyst, and whether the apparatus for purifying exhaust gas is out of order.

The electrically heated catalyst may transfer heat to the first three-way catalyst by radiation, and transfer heat to the second three-way catalyst by radiation and convection.

The first three-way catalyst and the second three-way catalyst may have improved carbon monoxide and hydrocarbon purification performance in a leaner atmosphere, and have improved nitrogen oxide purification performance in a richer atmosphere.

The first three-way catalyst and the second three-way catalyst may include one or a combination of ceria ($CeO_2$), zirconia ($ZrO_2$), platinum (Pt), palladium (Pd), rhodium (Rh), zeolite, alumina ($Al_2O_3$), gold (Au), titania, and manganese (Mn).

The first three-way catalyst and the second three-way catalyst may include a nitrogen oxide occlusion material.

The first three-way catalyst and the second three-way catalyst may be coated on a particulate matter filter (PF) and used.

Temperatures of the first three-way catalyst and the second three-way catalyst may be estimated through modeling or measured by using a temperature sensor installed in the The catalyst activation temperature may be a temperature at which the carbon monoxide (CO), hydrocarbon (HC), and nitrogen oxide ($NO_x$) purification performance of the first three-way catalyst and the second three-way catalyst becomes 99% or more under a condition that an air-fuel ratio is 1.

According to the embodiment of the present disclosure, the electrically heated catalyst is mounted between two three-way catalysts located at the rear end of the engine combustion chamber to cause the three-way catalyst quickly to reach the activation temperature, reduce heat loss, and improve the performance of purifying noxious components of exhaust gas, so that it is possible to respond to the stricter exhaust gas regulations of EU7 or higher, including SULEV 30, by improving the internal combustion engine noxious gas purification performance under all operating conditions.

In addition, fuel efficiency may be improved by improving exhaust gas purification performance.

DETAILED DESCRIPTION

Figure 1:
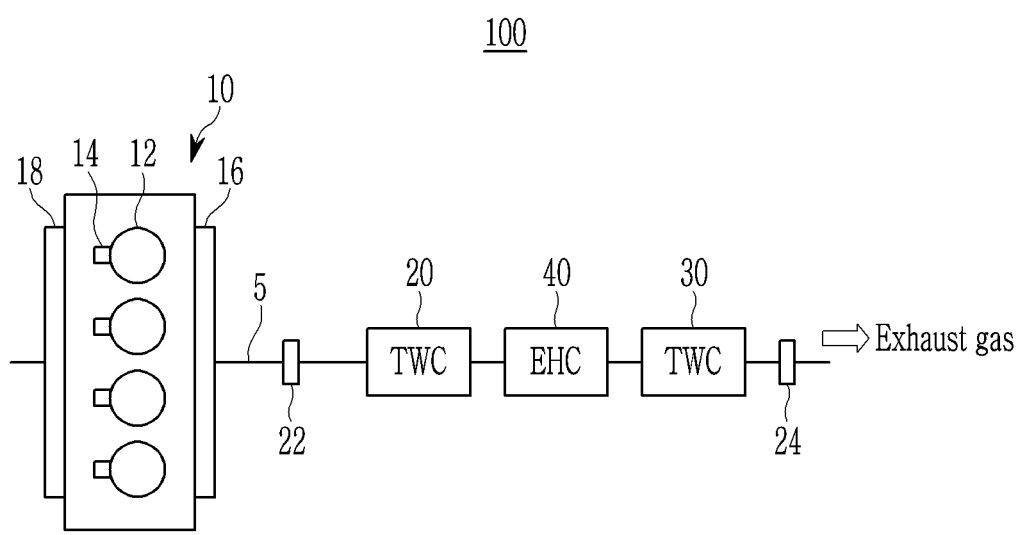
FIG. 1 is a diagram schematically illustrating an apparatus for purifying exhaust gas according to an exemplary embodiment of the present disclosure.

In the following detailed description, only certain exemplary embodiments of the present disclosure have been shown and described, simply by way of illustration. However, the present disclosure can be variously implemented and is not limited to the following embodiments.

Further, in several exemplary embodiments, a constituent element having the same configuration will be representatively described in one exemplary embodiment by using the same reference numeral, and other configurations different from those of the one exemplary embodiment will be described in other exemplary embodiments.

It is noted that the drawings are schematic and not drawn to scale. Relative dimensions and proportions of parts in the drawings are shown exaggerated or reduced in size for clarity and convenience in the drawing, and any dimensions are illustrative only and not limited. In addition, the same reference numerals are used to indicate like features to the same structure, element, or part appearing in two or more drawings. When a part is referred to as being "on" or "on" another part, it may be directly on the other part or the other part may be involved in between.

An embodiment of the present disclosure specifically represents one embodiment of the present disclosure. As a result, various modifications of the diagram are expected. Accordingly, the embodiment is not limited to a specific form of the illustrated area, and includes, for example, a form modification by manufacturing.

Hereinafter, an apparatus for purifying exhaust gas according to an embodiment of the present disclosure will be described in detail with reference to the accompanying drawings.

FIG. 1 is a diagram schematically illustrating an apparatus for purifying exhaust gas according to an exemplary embodiment of the present disclosure.

Referring to FIG. 1, an apparatus for purifying exhaust gas 100 according to an embodiment of the present disclosure includes an engine 10, a first three way catalyst (TWC) 20, a second three way catalyst 30, and an electrically heated catalyst (EHC) 40.

The engine 10 converts chemical energy into mechanical energy by burning a mixture of fuel and air. The engine 10 is connected to the intake manifold 18 to introduce air into a combustion chamber 12, and the exhaust gas generated in the combustion process is collected in the exhaust manifold 16 and then discharged out of the engine 10. An injector 14 is mounted in the combustion chamber 12 to inject fuel into the combustion chamber 12. In this case, the engine 10 may be an engine of an electrified internal combustion engine that generates power by using an internal combustion engine and a motor. The electrified internal combustion engine may rotate the engine 10 or an axle by driving a motor.

The first three-way catalyst (TWC) 20 and the second three-way catalyst 30 are sequentially mounted on an exhaust pipe 5 at a rear end of the engine 10, and converts noxious gas including carbon monoxide (CO), hydrocarbons (HC), and nitrogen oxide ($NO_x$) contained in the exhaust gas into harmless components through an oxidation-reduction reaction. For example, the first three-way catalyst 20 and the second three-way catalyst 30 may convert hydrocarbons in the exhaust gas into $H_2O$ and $CO_2$, carbon monoxide into $CO_2$, and nitrogen monoxide into Na and $NO_2$ as an oxidation reaction.

The first three-way catalyst 20 and the second three-way catalyst 30 according to the embodiment of the present disclosure may include one or a combination of ceria ($CeO_2$), zirconia ($ZrO_2$), platinum (Pt), palladium (Pd), rhodium (Rh), zeolite, alumina ($Al_2O_3$), gold (Au), titania, and manganese (Mn). In this case, the content of noble metals including platinum (Pt), palladium (Pd), and rhodium (Rh) in the first three way catalyst 20 and the second three way catalyst 30 may be 20 g/l or less. In addition, the three-way catalysts 20 and 30 may be configured to include a nitrogen oxide occlusion material.

In addition, the first three-way catalyst 20 and the second three-way catalyst 30 have improved carbon monoxide and hydrocarbon purification performance in a leaner atmosphere, and improved nitrogen oxide purification performance in a richer atmosphere. In addition, in the first three-way catalyst 20 and the second three-way catalyst 30 have rapidly changed carbon monoxide, hydrocarbon and nitrogen oxide purification performance in the vicinity of the theoretical air-fuel ratio where the lean atmosphere and the rich atmosphere intersect.

The first three-way catalyst 20 and the second three-way catalyst 30 may be coated on a particulate matter filter (PF) and used.

An electrically heated catalyst (EHC) is mounted between the first three-way catalyst 20 and the second three-way catalyst 30, and is heated by applying electric power to transfer heat to the first three-way catalyst 20 and the second three-way catalyst 30 to cause the first three-way catalyst 20 and the second three-way catalyst 30 to reach the catalyst activation temperature. The catalyst activation temperature may be a temperature at which the carbon monoxide, hydrocarbon, and nitrogen oxide purification performance of the first three-way catalyst 20 and the second three-way catalyst 30 becomes 99% or more under the condition that the air-fuel ratio is 1.

The electrically heated catalyst 40 may have a lower cell density than the first three-way catalyst 20 and the second three-way catalyst 30, and may apply heat energy to the first three-way catalyst 20 and the second three-way catalyst 30 by using the electric energy of a battery mounted in a mild hybrid electric vehicle (MHEV) or a (plugged-in) hybrid electric vehicle ((P)HEV).

In this case, the driving of the electrically heating catalyst 40 may be changed according to state of charge (SOC) of the battery, a temperature of the engine 10, an operating mode of the engine 10, temperature and flow rate of exhaust gas, temperatures of the first three-way catalyst 20 and the second three-way catalyst 30, outdoor conditions, operating time and non-operating time of the electrically heated catalyst 40, and whether the apparatus for purifying exhaust gas 100 is out of order.

The temperatures of the first three-way catalyst 20 and the second three-way catalyst 30 may be estimated through modeling or measured by using temperature sensors 22 and 24 positioned on the exhaust pipe 5. The first temperature sensor 22 may be mounted on the exhaust pipe 5 in front of the first three-way catalyst 20 to detect the temperature of the exhaust gas that has passed through the engine 10. In addition, the second temperature sensor 24 may be mounted on the exhaust pipe 5 at the rear end of the second three way catalyst 30 to detect a temperature of the exhaust gas that has passed through the first three-way catalyst 20, the electrically heated catalyst 40, and the second three-way catalyst 30.

Meanwhile, an oxygen sensor (not shown) may be mounted at the rear end of the three-way catalysts 20 and 30 in the exhaust pipe 5 to perform lean/rich control of the exhaust gas. In addition, a nitrogen oxide sensor (not shown) for measuring the amount of nitrogen oxide may be mounted at the rear end of the three-way catalysts 20 and 30 to be used to determine the amount of the reducing agent to be injected from an injection module (not shown).

Meanwhile, heat generated by operating the electrically heated catalyst 40 may be transferred to the first three-way catalyst 20 by radiation, and may be transferred to the second three-way catalyst 30 by radiation and convection.

Figure 2:
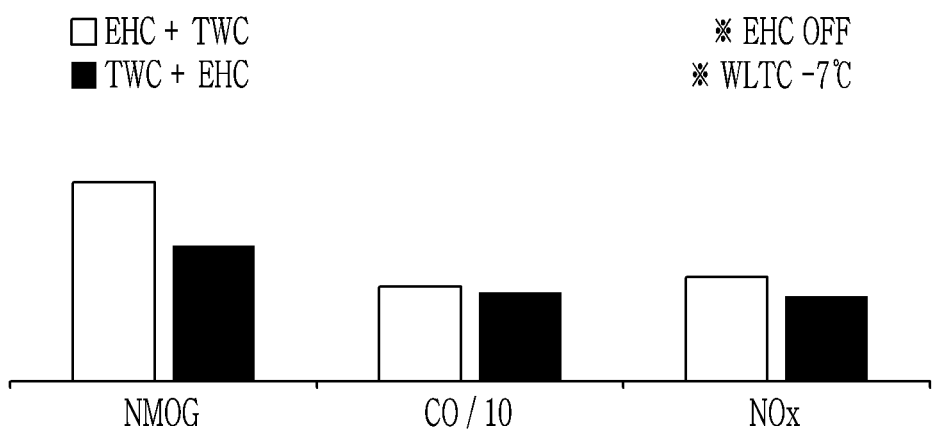
FIG. 2 is a diagram showing exhaust gas purification performance of the apparatus for purifying exhaust gas according to the embodiment of the present disclosure compared with the apparatus in the related art.

FIG. 2 is a diagram showing exhaust gas purification performance of the apparatus for purifying exhaust gas according to the embodiment of the present disclosure compared with the apparatus in the related art.

Referring to FIG. 2, the height of the bar graph indicates the amount of noxious gas detected for each type of noxious gas. When the temperature of the exhaust gas is −7° C. and the operating of the electrically heated catalyst 40 is off, the amount of noxious gas detected varies according to the position of the electrically heated catalyst 40.

That is, it can be seen that compared to the existing case in which the electrically heated catalyst is disposed at the rear end of the engine combustion chamber, in the case where the three-way catalyst 20 is disposed at the rear end of the engine 10 and the combustion chamber 12 of the apparatus for purifying exhaust gas 100 according to the present disclosure and the electrically heated catalyst 40 is disposed at the rear end of the three-way catalyst 20, the amount of hydrocarbons, carbon monoxide, and nitrogen oxide detected is reduced.

According to the present disclosure, by disposing the three-way catalyst 20 having a high cell density closer to the combustion chamber 12 than the electrically heated catalyst 40 having a low cell density, it is possible to solve the problem of heat loss even in the non-operating condition of the electrically heated catalyst 40.

In addition, under the operating condition of the electrically heated catalyst 40, in the first three-way catalyst 20 at the front end of the electrically heated catalyst 40, the catalyst temperature may be rapidly increased through radiative heat transfer, and in the second three-way catalyst 30 at the rear end of the electrically heated catalyst 40, the catalyst temperature is rapidly increased through convective heat transfer as well as radiative heat transfer, to cause the three-way catalysts to rapidly reach the catalyst activation temperature, thereby improving the performance of purifying noxious exhaust gas.

As such, according to the embodiment of the present disclosure, the electrically heated catalyst is mounted between two three-way catalysts located at the rear end of the engine combustion chamber to cause the three-way catalyst quickly to reach the activation temperature, reduce heat loss, and improve the performance of purifying noxious components of exhaust gas, so that it is possible to respond to the stricter exhaust gas regulations of EU7 or higher, including SULEV 30, by improving the internal combustion engine noxious gas purification performance under all operating conditions.

In addition, fuel efficiency may be improved by improving exhaust gas purification performance.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for purifying exhaust gas, the apparatus comprising:
    an engine configured to produce power by burning a mixture of air and fuel, and to discharge exhaust gas generated in a combustion process to the outside through an exhaust pipe;
    a first three-way catalyst and a second three-way catalyst which are sequentially mounted on the exhaust pipe at a rear end of the engine, and configured to convert noxious gas including carbon monoxide (CO), hydrocarbons (HC), and nitrogen oxide (NOx) contained in the exhaust gas into harmless components through an oxidation-reduction reaction; and
    an electrically heated catalyst (EHC) mounted between the first three-way catalyst and the second three-way catalyst, and heated by application of electric power to transfer heat to the first three-way catalyst and the second three-way catalyst to cause the first three-way catalyst and the second three-way catalyst to reach a catalyst activation temperature;
    wherein the electrically heated catalyst has a lower cell density than the first three-way catalyst and the second three-way catalyst to decrease heat loss even in the non-operating condition of the electrically heated catalyst.

2. The apparatus of claim 1, wherein:
    the engine is an electrified internal combustion engine that produces power by using an internal combustion engine and a motor.

3. The apparatus of claim 1, wherein:
    the electrically heated catalyst supplies heat energy to the first three-way catalyst and the second three-way catalyst by using electric energy of a battery mounted in a mild hybrid electric vehicle (MHEV) or a (plugged-in) hybrid electric vehicle ((P)HEV).

4. The apparatus of claim 3, wherein:
driving of the electrically heated catalyst varies according to state of charge (SOC) of the battery, a temperature of the engine, an operating mode of the engine, temperature and flow rate of the exhaust gas, temperatures of the first three-way catalyst and the second three-way catalyst, outdoor conditions, operating time and non-operating time of the electrically heated catalyst, and whether the apparatus for purifying exhaust gas is out of order.

5. The apparatus of claim 1, wherein:
the electrically heated catalyst is configured to transfer heat to the first three-way catalyst by radiation, and to transfer heat to the second three-way catalyst by radiation and convection.

6. The apparatus of claim 1, wherein:
the first three-way catalyst and the second three-way catalyst have improved carbon monoxide and hydrocarbon purification performance in a leaner atmosphere, and have improved nitrogen oxide purification performance in a richer atmosphere.

7. The apparatus of claim 1, wherein:
the first three-way catalyst and the second three-way catalyst includes one or a combination of ceria (CeO2), zirconia (ZrO2), platinum (Pt), palladium (Pd), rhodium (Rh), zeolite, alumina (Al2O3), gold (Au), titania, and manganese (Mn).

8. The apparatus of claim 1, wherein:
the first three-way catalyst and the second three-way catalyst include a nitrogen oxide occlusion material.

9. The apparatus of claim 1, wherein:
the first three-way catalyst and the second three-way catalyst are coated on a particulate matter filter (PF).

10. The apparatus of claim 1, wherein:
temperatures of the first three-way catalyst and the second three-way catalyst are estimated through modeling or measured by using a temperature sensor positioned on the exhaust pipe.

11. The apparatus of claim 1, wherein:
the catalyst activation temperature is a temperature at which the carbon monoxide (CO), hydrocarbon (HC), and nitrogen oxide (NOx) purification performance of the first three-way catalyst, and the second three-way catalyst becomes 99% or more under a condition that an air-fuel ratio is 1.

* * * * *